United States Patent [19]

Kurokami et al.

[11] Patent Number: 5,790,597
[45] Date of Patent: Aug. 4, 1998

[54] APPARATUS AND METHOD FOR INTERFERENCE COMPENSATION

[75] Inventors: Yuzo Kurokami; Hideki Matsuura, both of Tokyo, Japan

[73] Assignee: NEC Corporation, Tokyo, Japan

[21] Appl. No.: 496,472

[22] Filed: Jun. 29, 1995

[30] Foreign Application Priority Data

Jun. 29, 1994 [JP] Japan .................. 6-147682

[51] Int. Cl.$^6$ .................. H03H 7/30; H03H 7/40
[52] U.S. Cl. .................. 375/233; 375/235; 364/724.2
[58] Field of Search .................. 375/229, 232, 375/234, 235, 346, 348, 350; 364/724.2; 333/18, 28 R

[56] References Cited

U.S. PATENT DOCUMENTS 5,495,501  2/1996  Iwamatsu et al. .................. 375/232

FOREIGN PATENT DOCUMENTS 3-131116  6/1991  Japan .

Primary Examiner—Chi H. Pham
Assistant Examiner—William Luther
Attorney, Agent, or Firm—Sughrue, Mion, Zinn, Macpeak & Seas, PLLC

[57] ABSTRACT

An interference compensator for compensating interference waves with long delay times generated during digital microwave communications system-based relaying of waves at a single frequency. The compensator receives a demodulated digital signal, passes the signal through shift registers with different delay times, and then, through a forward equalizer, a first backward equalizer, a second backward equalizer and a center equalizer. All equalizers are transversal type equalizers, outputs from which are added as an output. In addition, the compensator is equipped with a delay time control circuit which monitors the tap coefficients of the forward equalizer, the backward equalizers and the center equalizer and controls the delay times of the shift registers so that the tap coefficients become greatest at the center delay circuits of the respective transversal type filters.

12 Claims, 7 Drawing Sheets

APPARATUS AND METHOD FOR INTERFERENCE COMPENSATION

BACKGROUND OF THE INVENTION

The present invention relates to an interference compensator used for demodulators in digital microwave communications systems.

Recently, for more efficient utilization of frequencies single-frequency relay systems which send and receive waves at an identical frequency via a plurality of relay stations connected longitudinally in series, are increasingly being used for QAM (quadrature amplitude modulation) system-based digital microwave communications. It is precisely the use of an identical frequency for sending and receiving in these systems that tends to cause overreach interference because of leaping of waves over relay stations, inter-reflection interference by coupling of waves via antennas of the relay stations themselves, delay interference because of reflection from buildings, etc., thus presenting the problem of impaired communications quality.

The above-mentioned phenomenon of generation of interference will now be concretely explained with reference to the drawings.

FIG. 1 is illustrative of a case where digital radio signals are sent and received via relay stations 51, 52, 53 and 54 along a digital microwave line which is based on a single-frequency relay system. In the drawing, a desired wave 21 is transmitted from the relay station 51 to the relay station 52, a desired wave 22 from the relay station 52 to the relay station 53, and a desired wave 23 from the relay station 53 to the relay station 54, respectively.

Here, for example,-of signals which the relay station 53 receives, the relay station 53 not only receives the desired wave 22, but also is influenced by overreach interference by an overreach interference wave 31 which is generated by leaping of the sending wave 21 from the relay station 51 over the relay station 52, inter-reflection interference which results from generation of an inter-reflection interference wave 33 which is the sending wave 23 itself from the relay station 53 which is directly received by its receiving side and reflection interference by a reflection interference wave 32 which results from reflection of the sending wave 22 from the relay station 52 by a reflecting object 55.

As for the characteristics of these interference waves, overreach interference is advance interference characterized by the arrival of an interference wave earlier than the desired wave, inter-reflection interference is short delay interference due to an interference wave which propagates a short distance, and reflection interference which is caused by reflection from buildings, etc. is high delay interference due to an interference wave which propagates a long distance.

Methods of the prior art which compensate such interference waves involve the use of a transversal type equalizer in cases where the interference wave has a short delay time. Specifically, since the prior art transversal type equalizers is aimed at compensating waveform distortions caused by interference waves which have relatively short delay times, their tapped configurations comprise approximately nine taps.

FIG. 2 is a view illustrative of details of the configuration of an interference compensator constructed with a transversal filter with nine taps. The QAM (quadrature amplitude modulation)-based P-channel signal which has been inputted to a terminal 101 is inputted to both an F/F (flip-flop) 111 and an F/F (flip-flop) 129 as delay circuits, whereas the Q-channel signal which has been inputted to a terminal 102 is inputted to both an F/F 120 and an F/F 138 as delay circuits. Also, to the output side of the F/F 111 there are longitudinally connected eight delay circuits F/F 112 through F/F 119 with outputs which are delayed by 1 bit, 2 bits, ... 8 bits, respectively, in terms of the clock cycle. The output sides of the four delay circuits F/F 111 through F/F 114 are connected to multipliers 151 through 154, while the output sides of the F/F 116 through F/F 119 are connected to multipliers 156 through 159 as well. Similarly, eight delay circuits F/F 130 through F/F 137 are longitudinally connected to the output side of the F/F 129 in succession, while the output sides of the F/F 129 through F/F 132 and the output sides of the F/F 134 through F/F 137 are connected to multipliers 169–172 and multipliers 174–177, respectively.

On the other hand, for the Q-channel as well, of nine delay circuits F/F 120 through F/F 128, multipliers 160–163 are connected to the output sides of the F/F 120 through F/F 123, while multipliers 165–168 are connected to the output sides of the F/F 125 through F/F 128, in the same manner as the P-channel. In addition, for the nine delay circuits F/F 138 through F/F 146 as well, multipliers 228–231 and multipliers 183–186 are connected to the output sides of the F/F 138 through F/F 141 and the output sides of the F/F 143 through F/F 146, respectively.

The data transmitted through the P-channel is outputted from an output terminal 103 as combined data by a combiner 106 which is the sum of the outputs of the multipliers 151–154, 156–159, 160–163 and 165–168, and the output signal of the F/F 115. The configuration explained above has been realized in the well-known transversal type equalizer. That is, the transversal type equalizer is designed to synthesize outputs from the respective taps of a tapped delay line after assigning weights thereto, and waveform distortions are compensated by creating reverse characteristics of the transmission path according to the ZF (Zero-Forcing) method, etc., whereby the weights are adjusted repeatedly. In the above-mentioned case shown in FIG. 2, the weights to the respective taps are determined by multiplication by the respective tap coefficients fed by a control signal generator circuit 105, at the multipliers 151–154, 156–159, 160–163 and 165–168.

In addition, a transversal type equalizer is also constructed for the Q-channel in an equivalent manner, wherein the output signals of multipliers 169–172, 174–177, 178–181 and 183–186 connected to F/F 129–137 and F/F 138–146 and the output signal of an F/F 142 are combined by a combiner 107, and the result is outputted from a terminal 104 as Q-channel data. To the control signal generator circuit 105 for the above-described transversal type equalizers there have been inputted discrimination signals DP and DQ which indicate the quadrants of the signals transmitted through the P-channel and the Q-channel, error signals EP and EQ which indicate the directions of deviation of the P-channel signal and the Q-channel signal from reference points and a clock signal CLK.

This control signal generator circuit 105 examines the correlation between the discrimination signal and the error signal for each tap and performs caluculations of weights for the taps in a well-known manner to control the tap coefficients so that both the P-channel data output and the Q-channel data output are free from waveform distortions due to interference waves.

In the prior art instance being explained, independent control is made of sixteen tap coefficients to obtain the P-channel data output 103 and of sixteen tap coefficients to obtain the Q-channel data output 104. More specifically, the total of thirty-two tap coefficients to be inputted to the multipliers 151–154, 156–159, 160–163, 165–168, 169–172, 174–177, 178–181 and 183–186 are indicated by $C_{-4}^{PR}, \ldots C_{-1}^{PR}, C_1^{PR}, \ldots C_4^{PR}, C_{-4}^{Pi}, \ldots C_{-1}^{Pi}, C_1^{Pi}, \ldots C_4^{Pi}, C_{-4}^{Qi}, \ldots C_{-1}^{Qi}, C_1^{Qi}, \ldots C_4^{Qi}, C_{-4}^{QR}, \ldots C_{-1}^{QR}, C_1^{QR}, \ldots C_4^{QR}$, respectively. Since even the detailed configuration and the operations of the control signal generator circuit 105 may be the same as those of the conventional control signal generator circuit used for the well-known transversal type equalizer, an explanation thereof is omitted. The above-mentioned configuration and the operations are disclosed in, for example, Japanese Published Unexamined Patent Application No. 3-131116 (1991).

Supposing that the tap interval is equal to the signal interval, the equalization capability of the transversal type equalizer with the nine taps which is explained above covers ±4 taps around the center, that is, a delay time of $$\pm \frac{1}{15 \times 10^6} \times 4 = 0.267 \ \mu s$$

in cases where the signal speed of the input signal to the transversal type equalizer is as fast as 15 MHz. Apparently, only nine taps or so are not sufficient for longer delay times.

As an example, since equalization of delay times of ± a few μs or more is needed for interference waves due to reflection from buildings, etc., the above-described equalizer must be equipped with more than nine taps.

For example, on the assumption that the signal speed of the input to the equalizer is 15 MHz, and an interference wave which has a rather long delay time within the range of ±4 μs is being compensated, approximately 120 taps are required in cases where the tap interval is set to be identical to the signal interval (T), and the number of required taps amounts to as many as approximately 240 if the tap interval is set to T/2 in order to avoid reducing the compensation.

FIG. 3 shows an exemplary configuration of an interference compensator constructed with a transversal type equalizer equipped with 120 taps. In this drawing, in the same manner as for the configuration of the transversal type equalizer equipped with nine taps which is shown in FIG. 2, 120 delay circuits F/F 301-1 through 301-120 are longitudinally connected in series, with the configuration of the well-known transversal type equalizer wherein multipliers 302-1 through 302-119 are connected to the output sides of the respective delay circuits, and all the output signals are summed by an adder 303.

The use of transversal type equalizers 310, 320 and 330 of the same configuration as of the above-described transversal type equalizer allows output of signals free from interference waves from P DATA OUT and Q DATA OUT.

With the configuration of the prior art transversal type equalizer with many multi-stage taps as shown in FIG. 3, however, the numbers of delay circuits and multipliers increase as the number of taps increases, and this results in great upsizing of the hardware and increase in the delay time of the equalizer itself, thus presenting problems associated with control operations, which have obstructed its practical use even when scaled-up LSIs are used.

SUMMARY OF THE INVENTION

It is an object of the present invention to provide an interference compensator with a simple circuit configuration which eliminates the above-described problems which occur when waves at a single frequency are relayed, that is, long delay overreach interference, inter-reflection interference due to coupling of waves via intra-station antennas and delay interference because of reflection from buildings, etc.

In order to accomplish the above-mentioned object, the interference compensator of the present invention has the following configuration:

An interference compensator which is provided for a demodulator of a relay transceiver in order to compensate an interference wave which is generated in cases where the relay is performed in a digital radio communications system which sends and receives waves at a single frequency, comprising:

first through fourth shift registers with different delay times, to each of which is inputted a digital signal demodulated through the above-mentioned demodulator;

a forward equalizer (FE) which is constructed as a transversal type equalizer connected to the above-mentioned first shift register with the shortest of the delay times;

a first backward equalizer (BE) which is constructed as a transversal type equalizer connected to the second shift register with a longer delay time than the above-mentioned first shift register;

a second backward equalizer (BE) which is constructed as a transversal type equalizer connected to the above-mentioned third shift register with a longer delay time than the above-mentioned second shift register;

a center equalizer (CE) which is constructed as a transversal type equalizer connected to the fourth shift register with a delay time which is longer than the delay time of the above-mentioned first shift register, but shorter than the delay time of the second shift register;

a combiner for combining the output signals of the above-mentioned forward equalizer, first and second backward equalizers and center equalizer; and a delay time control circuit which monitors the tap coefficients of the above-mentioned forward equalizer, first and second backward equalizer and center equalizer to control the delay times of the above-mentioned first through fourth shift registers so that the center delay circuit of each transversal type filter has the greatest tap coefficient.

DETAILED DESCRIPTION OF THE PREFERRED EMBODIMENT

The interference compensator of the present invention which is constructed as described above will now be explained with reference to the drawings.

Figure 4:
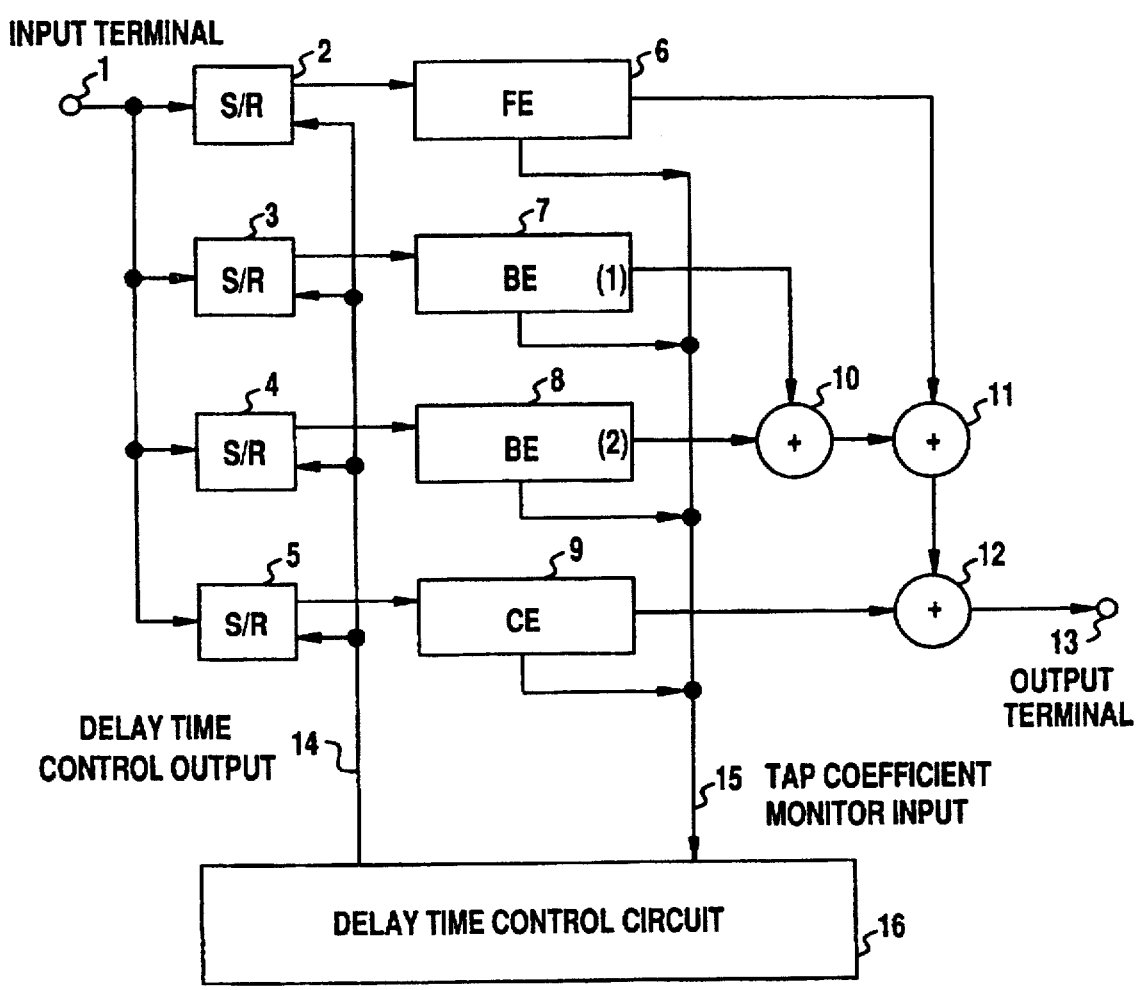
FIG. 4 is a block diagram illustrative of an embodiment of the present invention.

FIG. 4 is a block diagram which shows an embodiment of the interference compensator of the present invention, wherein 1 indicates a signal input terminal, 2–5 indicate four types of shift registers (hereunder to be abbreviated to S/R) which may control each delay time with reference to a delay time control output 14, 6 indicates a forward equalizer which is constructed as a transversal equalizer, 7 indicates a backward equalizer (1) which is constructed as a transversal equalizer, 8 is another backward equalizer (2) which is constructed as a transversal equalizer, 9 is a center equalizer which is constructed as a transversal equalizer, 10–12 indicate adders, 13 indicates a signal output terminal, 14 indicates a delay time control output, 15 indicates a tap coefficient monitor input, and 16 indicates a delay time control circuit.

As described above, interference signals which may be generated during digital radio communications result from three causes: the overreach interference, the inter-reflection interference due to wave coupling via antennas of relay stations themselves and the delay interference due to wave reflection from buildings, etc., which occur independently or simultaneously, and this necessitates compensation of all those types of interference. In view of this necessity, the present invention uses a method by which an inputted demodulated signal is passed through the shift registers which have optimum delay times matching the delay times of the respective interference waves, and the interference waves are equalized through the respective transversal equalizers.

More specifically, a demodulated signal which has undergone various types of interference as described above is inputted to the signal input terminal 1 which is shown in FIG. 4 and is decomposed into different delay signals which depend on the types of the particular interference waves, through the respective shift registers S/R 2, S/R 3, S/R 4 and S/R 5. The respective shift registers S/R 2 through 5 are constructed with a multi-stage arrangement of shift registers which allows respective prolonged delaying, and the number of stages are controlled by the delay time control outputs 14 from the delay time control circuit 16.

Figure 5:
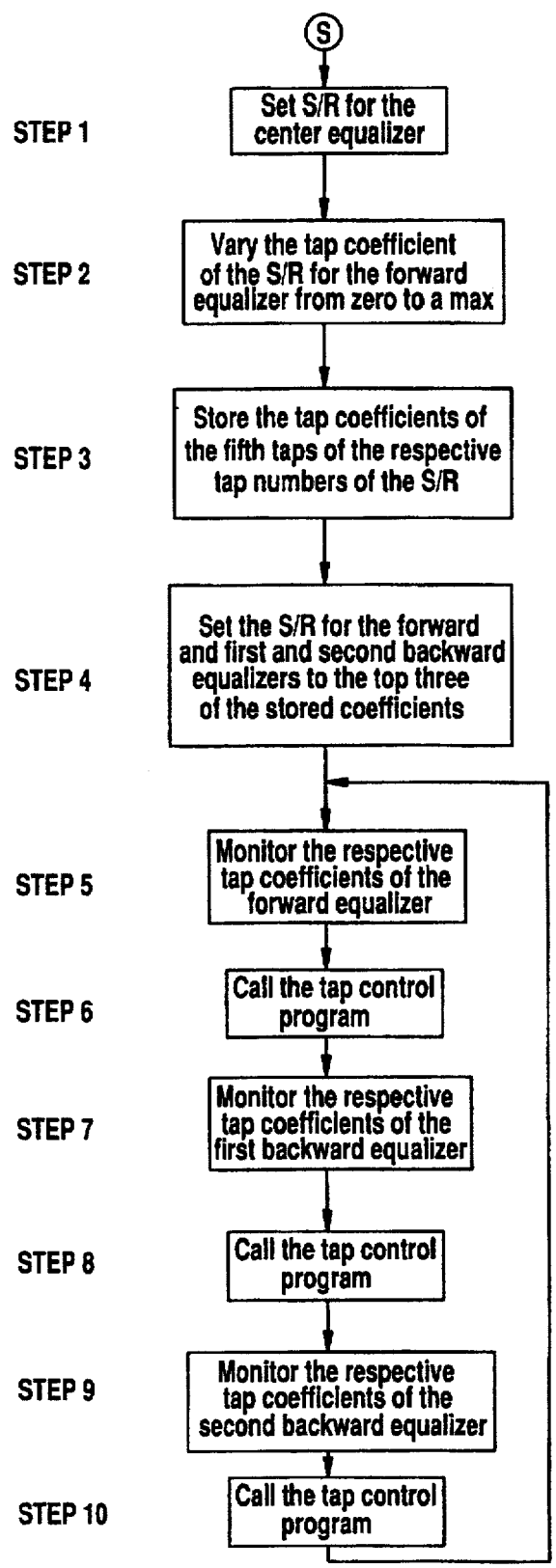
FIG. 5 is a view illustrative of the preset routine and the control manipulation routine of the delay time control circuit shown in FIG. 4.

The delay time control circuit 16 has the function of controlling the number of stages of shift registers which constitute the respective shift registers S/R 2 through 5, based on the inputted tap coefficients of the forward equalizer 6, the backward equalizer (1) 7, the backward equalizer (2) 8 and the center equalizer 9 which are connected to the respective shift registers S/R 2 through 5. This delay time control circuit 16 may be constructed with a usual control circuit which comprises a CPU, a memory, an I/O interface, etc. FIG. 5 illustrates the main flow of the control circuit software for the delay time control circuit 16 constructed in this manner.

In this drawing, STEP 1 through STEP 4 constitute a preset routine for determination of the number of stages of shift registers of the four shift registers S/R 2 through 5 at the beginning of their operations. Specifically, in STEP 1, of the four shift registers, the number of stages of the shift register S/R 5 for the center equalizer, which is designed to compensate interference such as fading, etc., is set to the median of the number of stages of the shift registers. Here, in the same manner as in the above-mentioned instance, each of the shift registers S/R 2 through 5 is designed to have a maximum delay compensation capability of ±4 μs for data transmitted at a signal speed of 15 MHz. In other words, the respective shift registers S/R 2 through 5 are required to have 122 stages of shift registers at the maximum, and such configuration may be readily constructed with usual ICs.

Therefore, in STEP 1, the number of stages of shift registers of the shift register S/R 5 is set to 61, i.e. the median of the number of stages of the above-mentioned 122-stage shift register.

In STEP 2, the number of stages of shift registers of the shift register S/R 2 for the forward equalizer 6 is varied from zero to a maximum (122 in the above-mentioned instance).

In STEP 3, the tap coefficients of the forward equalizer 6 are monitored, and the values of the tap coefficients, i.e. the medians of the numbers of stages of shift registers of the shift register S/R 2 which are varied from 0 to 122, for example, the tap coefficients of the fifth taps in the case of an arrangement of nine taps, are inputted as tap coefficient monitor inputs 15 and stored in the memory.

In STEP 4, the top three of the coefficients stored in STEP 3 are selected, and the numbers of stages which correspond thereto are set as the numbers of stages of shift registers for the S/R 2 for the forward equalizer 6, the S/R 3 for the backward equalizer (1) 7 and the S/R 4 for the backward equalizer (2) 8, respectively. As a result, the delay times of the shift registers S/R 2 through 5 have the following relationship:

S/R 2<S/R 5<S/R 3<S/R 4.

After the numbers of stages of the respective shift registers S/R 2 through 5 have been set by following the above-mentioned preset routine, the numbers of stages are automatically controlled to optimum numbers of stages of shift registers which depend on the actual line status, by following the control routine specified in STEPS 5–10.

Specifically, STEP 5 is for monitoring values of the respective taps of the forward equalizer 6.

Figure 6:
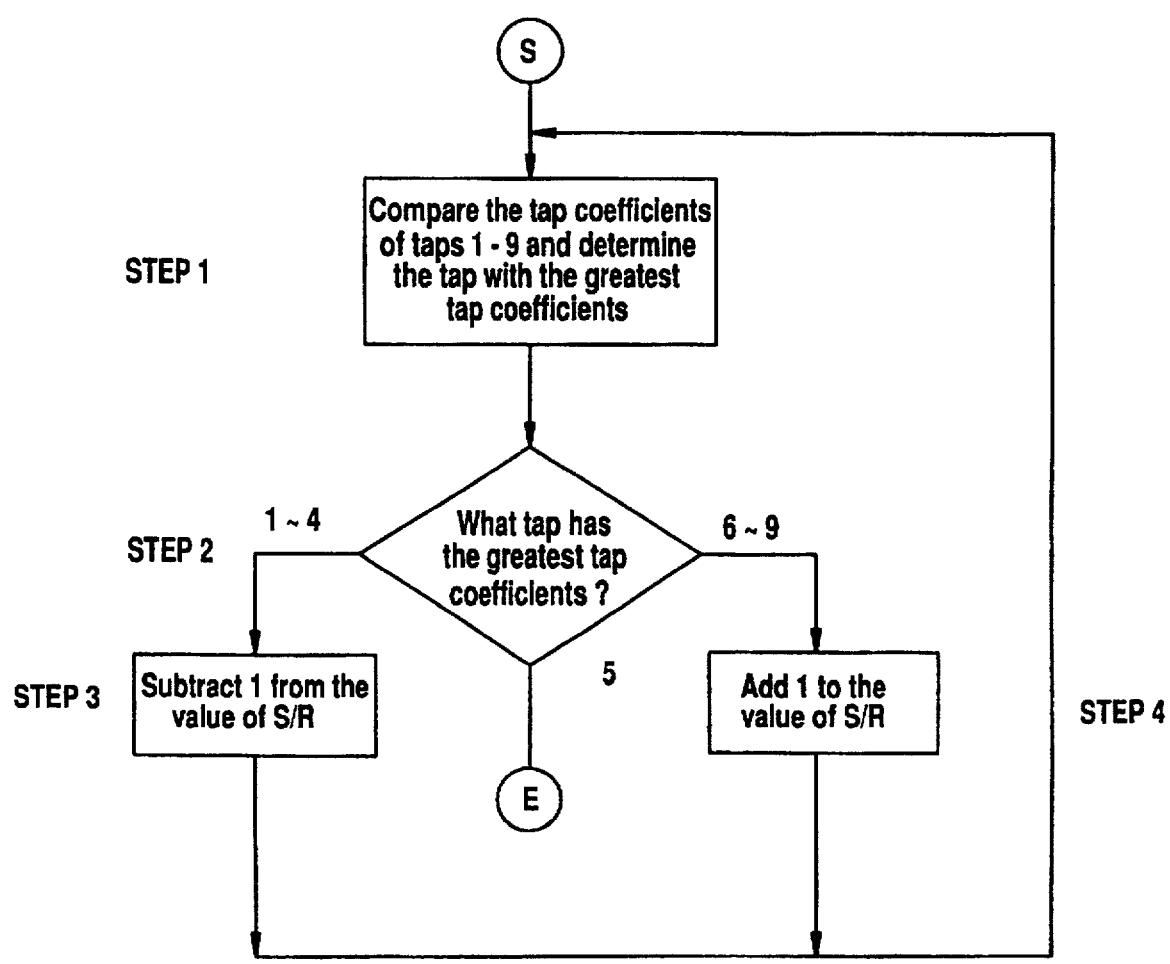
FIG. 6 is a view illustrative of details of the control manipulation routine of the delay time control circuit shown in FIG. 4.

In STEP 6, the value of the shift register S/R 2 is controlled to an optimum value based on the above-mentioned values of the tap coefficients by following the tap control program shown in FIG. 6. More specifically, in FIG. 6, the values of tap coefficients of the taps 1–9 are compared to determine the tap with the greatest value. In cases where the tap which has been determined in STEP 1 to have the greatest tap coefficient is found to be any one of the taps 1–4 in STEP 2, 1 is subtracted from the value of the shift register S/R 2. On the other hand, 1 is added to the value of the S/R 2 in cases where any one of the taps 6–9 is determined in STEP 2 to have the greatest tap coefficient.

By following the operations in STEP 7 through STEP 10 in the same manner as those in STEPS 5 and 6, the values of the shift register S/R 3 for the backward equalizer (1) and the shift register S/R 4 for the backward equalizer (2) are controlled to their respective optimum ones.

In the preset routine explained above, the number of stages of the S/R 2 for the forward equalizer was varied from zero to the maximum; nevertheless, it is not limited to this scheme, as the number of stages of, for example, the S/R 3 for the backward equalizer (1), the S/R 4 for the backward equalizer (2) or another circuit may be varied otherwise. In addition, although the value of the S/R 5 for the center equalizer is set to the median of the values of the shift resisters S/R in the present embodiment, it need not be limited thereto. The value may be controlled depending on the characteristics of the line.

The interference compensator of the present invention operates as described below, along the above-mentioned flow which is controlled by the delay time control circuit 16. That is, first, an overreach interference wave is passed through the S/R 2 and is then inputted to the forward equalizer 6. The delay time control circuit 16 monitors the tap coefficients of the forward equalizer 6 on the basis of the tap coefficient monitor inputs 15 and determines the point at which the overreach interference becomes greatest, by referring to the tap coefficients; the delay time of the S/R 2 is controlled by the delay time control output 14 so that the point is located at the center tap of the forward equalizer 6.

On the other hand, the inter-reflection interference wave is passed through the S/R 3 and then inputted to the backward equalizer (1) 7. For the backward equalizer (1) 7 as well, the delay time control circuit 16 determines, based on the tap coefficients, the point at which the inter-reflection interference becomes greatest and controls the delay time of the S/R 3 so that the point is located at the center tap of the backward equalizer (1) 7.

Further, a delay interference wave due to reflection from buildings, etc. is passed through the S/R 4 and then inputted to the backward equalizer (2) 8. For the backward equalizer (2) 8 as well, the delay time control circuit 16 determines, based on the tap coefficients, the point at which the interference due to reflection from buildings, etc. becomes greatest and controls the delay time of the S/R 4 so that the point is located at the center tap of the backward equalizer (2) 8.

Then, in practical use, the delay times of the respective shift registers S/R 2 through 5 are automatically controlled depending on the generation of interference waves so that the points at which the respective types of interference become greatest are located at the center taps of the forward equalizer 6, the backward equalizer (1) 7 and the backward equalizer (2) 8, respectively. Accordingly, all the interference waves may be equalized by minutely controlling the delay times of the respective equalizers which are each constructed as nine-stage transversal type equalizers.

Further details of the operations will now be explained with reference to the configuration of the forward equalizer 6.

Figure 7:
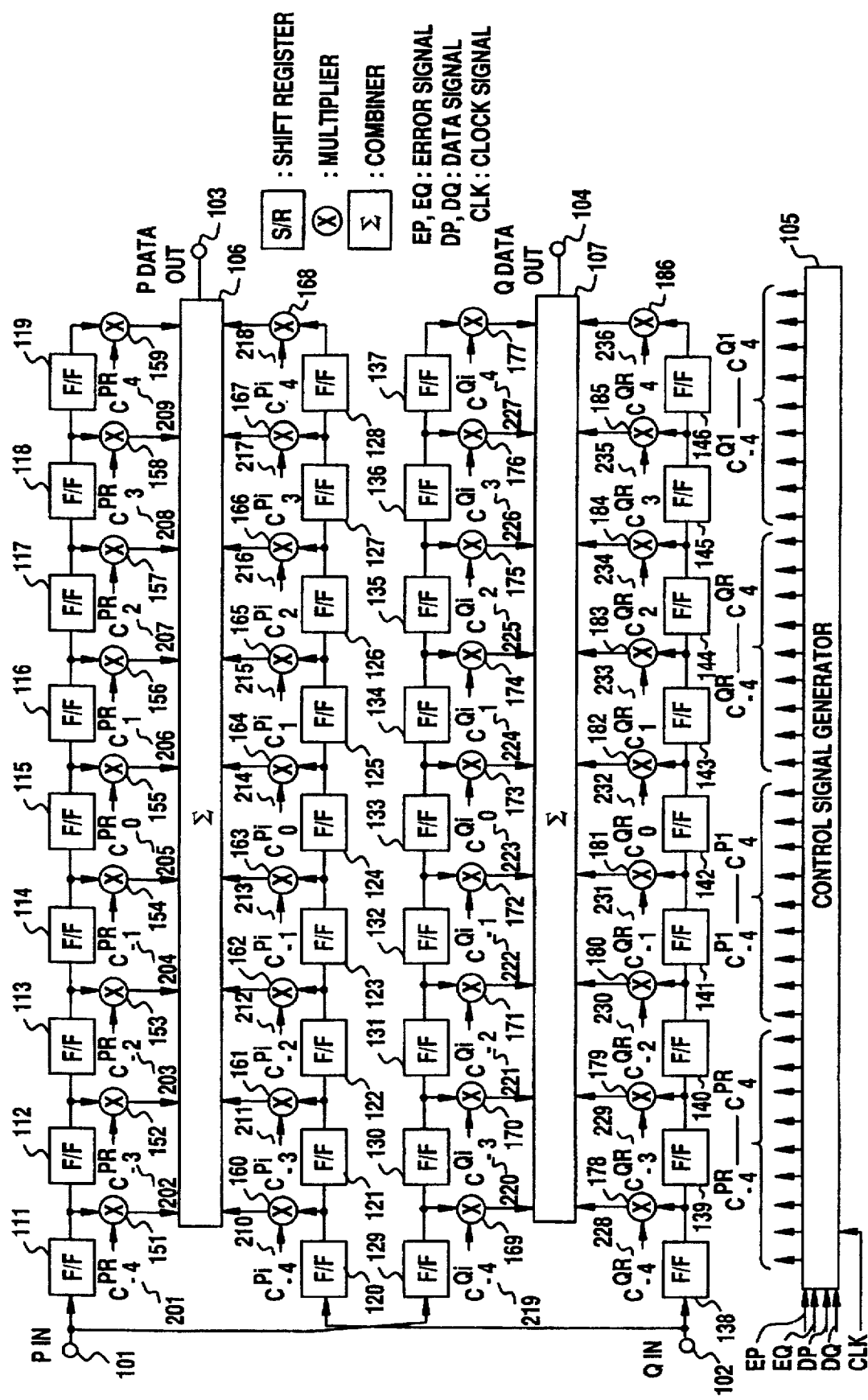
FIG. 7 is a schematic diagram of an embodiment of the forward equalizer (FE) shown in FIG. 4.

FIG. 7 is a view illustrative of an instance of the configuration of the forward equalizer 6. Here, since the backward equalizer (1) and the backward equalizer (2) may be constructed with the same configuration as of the one being explained, an explanation about them will be omitted. Although the number of taps is nine, as is the case with the nine-tap arrangement shown in FIG. 2 for compensation of short delay times, the present invention is not limited to this number and may be carried out with fewer taps depending on the delay times of the S/R 2 through 5. In the drawing, the forward equalizer is constructed with a transversal type equalizer equipped with quadrature compensators, each with a tap interval of T/2. In FIG. 7, the P-channel signal is inputted to an input terminal P IN 101, while the Q-channel signal is inputted to an input terminal Q IN 102. These signals are shifted on a bit-by-bit basis through flip-flops F/F 111–119 and F/F 129–137 (for the P-channel signal), and F/F 120–128 and F/F 138–146 (for the Q-channel signal), respectively, and then inputted to multipliers 151–159 and 169–177 (for the P-channel signal), and multipliers 160–168 and 178–186 (for the Q-channel signal), respectively.

Figure 1:
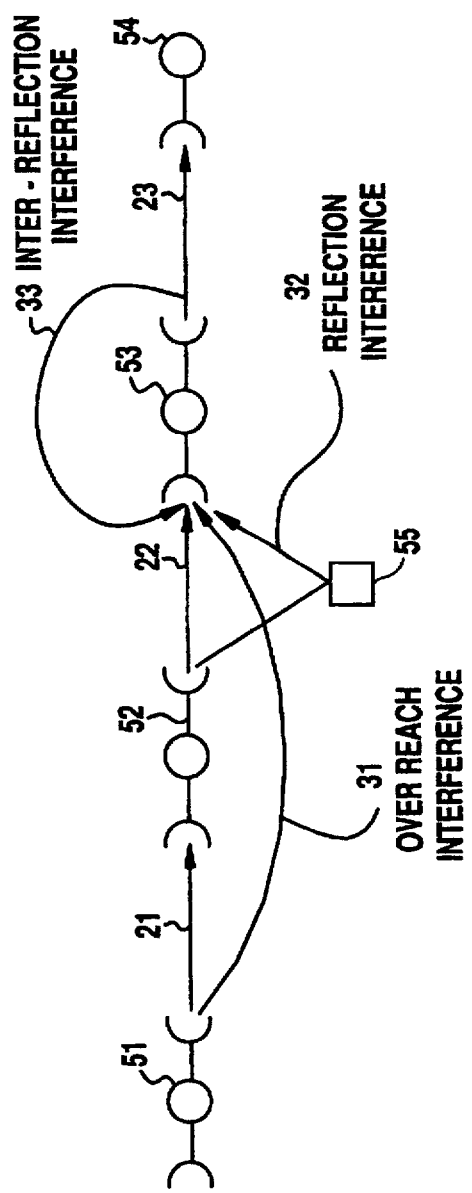
FIG. 1 is a view illustrative of the mechanism of generation of each type of reflected wave which has a plurality of relay stations in a digital microwave relay system.
Figure 2:
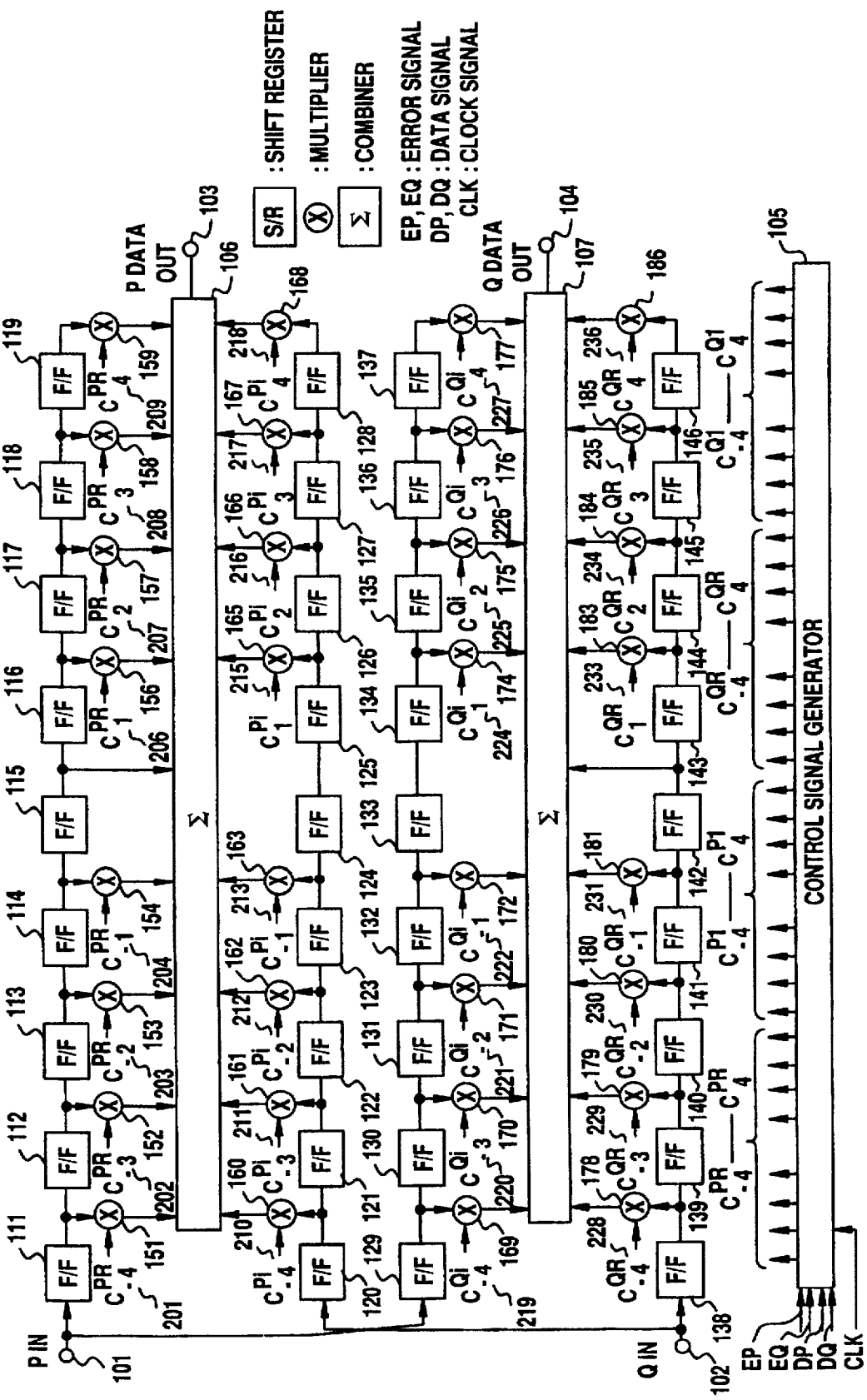
FIG. 2 is a view illustrative of the configuration of a prior art transversal type equalizer equipped with nine taps.
Figure 3:
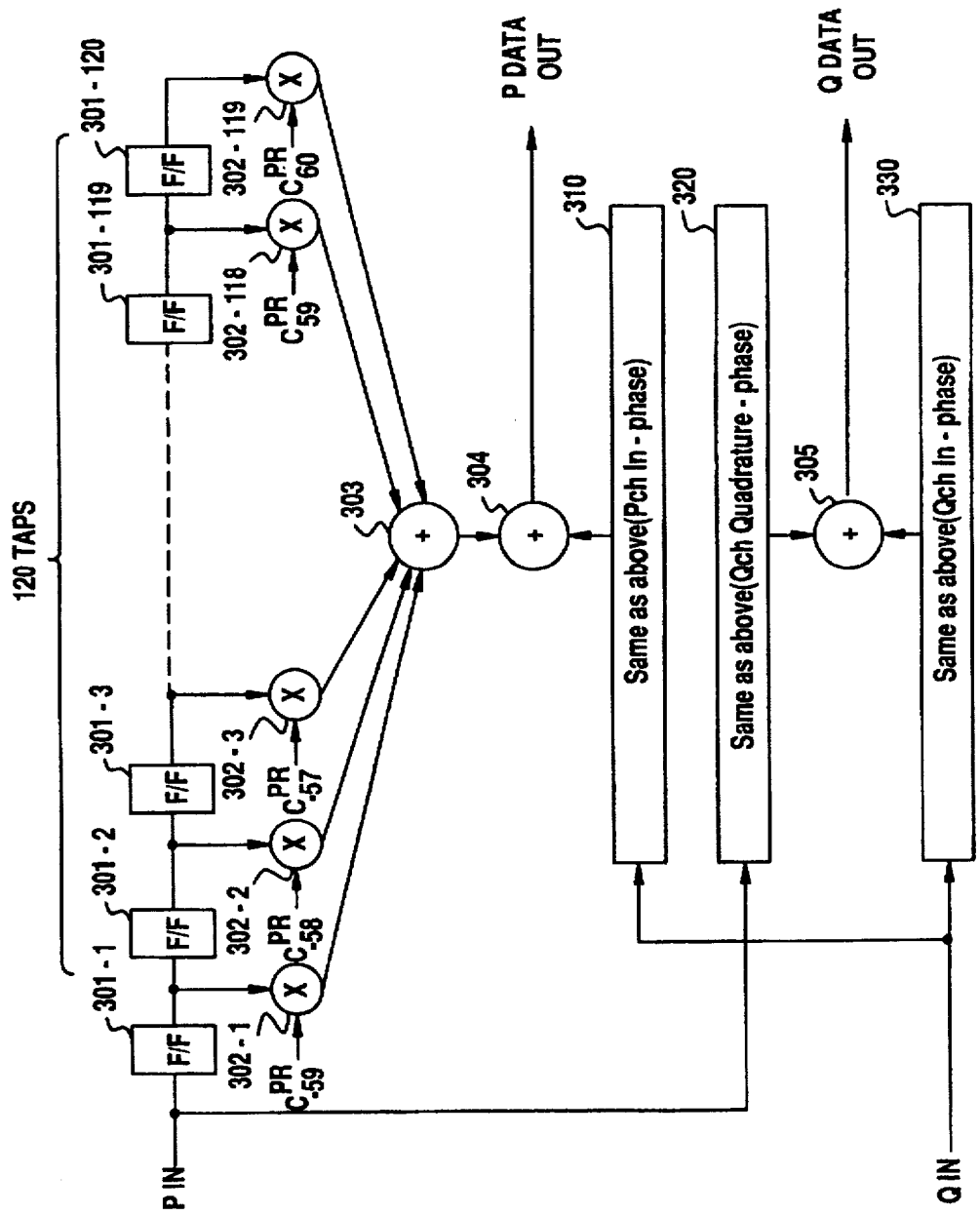
FIG. 3 is a view illustrative of the configuration of a prior art transversal type equalizer equipped with 120 taps.

The respective multipliers 151–186 perform multiplication by control signals 201–236, respectively, which are generated by a control signal generator circuit 105; outputs from the multipliers 151–168 are combined by a combiner 106, and outputs from the multipliers 169–186 are combined by a combiner 107. The result is that the output from the combiner 106 is the P-channel output 103, and the output from the combiner 107 is the Q-channel output 104. The control signal generator circuit 105 may have exactly the same configuration as that of control signal generator circuits which are used for usual transversal type equalizers, as described with reference to FIG. 2; for example, the circuit may be constructed with the transversal type equalizer control circuit described in Japanese Unexamined Patent Application Disclosure No. 3-131116 (1991). The only difference of the above-described transversal type equalizer which is shown in FIG. 7 from the transversal type equalizer which is shown in FIG. 2 is that the control target of the former is the output from multiplication of the output from the center or fifth tap or delay circuit by the tap coefficient, whereas the latter does not subject the output from the fifth tap or delay circuit to the multiplication process. This difference derives from the fact that the tap control of the output from the center tap or delay circuit of the configuration shown in FIG. 2 will automatically result in its compensation with a gain, thus having same function thereof in cooperation with AGC (Automatic Gain Control) which is usually performed by the regular demodulator. This is the reason why the outputs from the center taps of usual transversal type equalizers are fixed.

On the other hand, since the same type of transversal type equalizer as according to the present invention is also used as the forward equalizer or the backward equalizer (1) or (2), the output from the center tap must be designed to be controlled; although there is certainly no need to control the output from the center tap of the center equalizer, different from the configuration shown in FIG. 2, the transversal type equalizer according to the present invention is constructed as described above since all the equalizers may have the same configuration with advantages by compulsorily controlling the output from the center tap of the center equalizer so that it has a fixed value.

The control signal generator circuit 105 examines the correlation between the respective signals and outputs, to each tap, a signal with characteristics being reverse to those of the distortion so that compensated output signals 103 and 104 are free from waveform distortions. In other words, taps with larger amounts of distortion of outputs cause generation of larger levels of control signals.

This configuration allows monitoring of the tap coefficients, that is, control signals 201–236 which are outputted from the control signal generator circuit 105 to the respective taps, to determine the point at which the inputted signals 101 and 102 are most greatly distorted.

As a result, the distortion may be eliminated most effectively by locating the point for the greatest distortion at the center of the present equalizer (the location of the multiplier 155, for example). Furthermore, even in cases where the location of interference varies, the equalizer may be located at the center of the interference by controlling the delay time of the S/R 2, i.e. the shift register for the input section which is shown in FIG. 4.

In addition, setting of each tap interval to T/n ( n represents a positive integer ) is more effective since the setting allows compensation even in cases where the location of interference is between the inputted signals. More specifically, control of the S/R 2 shown in FIG. 6 results in elimination of overreach interference by means of only nine taps or so. The backward equalizer (1) and the backward equalizer (2) are operated in the same manner as described above, so an explanation about them is omitted.

In order to compensate the three types of interference waves, the embodiment explained above is constructed with the forward equalizer 6, the backward equalizer (1) 7, the backward equalizer (2) 8 and the center equalizer 9, not all of which, however, are needed in all cases. Only the center equalizer 9 and the forward equalizer 6 are sufficient for some types of interference waves, while only the center equalizer 9, the backward equalizer (1) 7 and the backward equalizer (2) 8 may be sufficient in some cases. It is further to be noted that although only two backward equalizers are used for two types of delay times in the above-described embodiment, three or more backward equalizers may be used.

As explained above, the present invention provides an interference equalizer for eliminating overreach interference or advance interference, inter-reflection interference by coupling of waves via antennas of relay staions themselves, delay interference due to reflection from buildings, etc., all of which are problems encountered when waves at a single frequency are being relayed. Accordingly, the present invention has the effect of providing a microwave digital line with a high degree of reliability, without impairing transmission property due to interference even during relaying of waves at a single frequency. In addition, the interference equalizer of the present invention, not being limited to single- frequency relay systems, may be employed over a wide range of uses including digital microwave lines.

What is claimed is:

1. An interference compensator for compensating interference waves in a received digital signal, comprising:

a plurality of first shift registers for receiving said digital signal, each of said first shift registers having respective numbers of stages, wherein said interference waves are split due to a difference in said respective numbers of stages;

a plurality of transversal type equalizers, having respective tap coefficients, connected to said plurality of first shift registers, respectively;

an adder for summing outputs from said plurality of transversal type equalizers; and a delay time control circuit for monitoring the tap coefficients of said plurality of transversal type equalizers and controlling respective numbers of stages of a plurality of second shift registers in order to match the medians of the tap coefficients.

2. An interference compensator as claimed in claim 1, wherein said digital signal is a demodulated quadrature signal to digital radio relay system-based relay equipment, wherein said equipment sends and receives waves at a single frequency.

3. An interference compensator as claimed in claim 1, wherein said interference waves include an overreach interference wave, an inter-reflection interference wave caused by coupling of send and receive waves via a relay station antenna, a delay interference wave caused by a reflecting object, and a fading interference wave due to fading in said digital signal.

4. An interference compensator as claimed in claim 1, wherein said plurality of first shift registers consists of first through fourth shift registers having respective first through fourth delay times;

said delay time control circuit controls said first through fourth delay times via said respective number of stages;

said first shift register has a first number of stages to mainly compensate the first delay time associated with an overreach interference wave in said digital signal;

said second shift register has a second number of stages to mainly compensate the second delay time associated with an inter-reflection interference wave in said digital signal;

said third shift register has a third number of stages to mainly compensate the third delay time associated with a delay interference wave in said digital signal; and said fourth shift register has a fourth number of stages to mainly compensate the fourth delay time associated with an interference wave due to fading in said digital signal.

5. An interference compensator as claimed in claim 1, wherein said plurality of transversal type equalizers allows division of said digital signal into two branches per quadrature channel, and comprises:

a plurality of longitudinally connected delay circuits, a control signal generator generating said tap coefficients associated with said delay circuits, and a plurality of multipliers multiplying outputs of said delay circuits by said tap coefficients, wherein outputs of said multipliers are combined per said quadrature channel.

6. An interference compensator as claimed in claim 1, wherein in said plurality of transversal type equalizers each of said equalizers has a tap interval of T/n, wherein T is an interval of the digital signal and n is a positive integer.

7. An interference compensator as claimed in claim 4, wherein the respective delay times of said first through fourth shift registers are set in such a manner that:

the first delay time is the shortest;

the second delay time is longer than the first and fourth delay times, and shorter than the third delay time;

the third delay time is the longest; and the fourth delay time is longer than the first delay time, and shorter than the second delay time.

8. An interference compensator as claimed in claim 5, wherein said plurality of transversal type equalizers comprises:

a forward equalizer connected to a first shift register, a first backward equalizer connected to a second shift register, a second backward equalizer connected to a third shift register, and a center equalizer connected to a fourth shift register.

9. An interference compensator as claimed in claim 8, wherein said plurality of transversal type equalizers further comprises at least three backward equalizers.

10. A control method for determining numbers of stages of first through fourth shift registers in an interference compensator, wherein a delay time control circuit monitors tap coefficients of a plurality of transversal type equalizers, at least one of said equalizers having a center tap, and controls said number of stages, comprising the steps of:

(a) setting said fourth shift register to a predetermined number of stages;

(b) varying the number of stages of said first shift register from zero to a maximum;

(c) storing the tap coefficient of the center tap of a forward equalizer for each of the number of stages of said first shift register; and (d) setting the first, second and third shift registers to the top three of said stored tap coefficients, respectively.

11. A control method for determining numbers of stages of the first through third shift registers in service in an interference compensator, wherein a delay time control circuit monitors tap coefficients of a plurality of transversal type equalizers, at least one of said equalizers having a center tap and a plurality of taps before and after said center tap, and controls said number of stages, comprising the steps of:

(a) monitoring the tap coefficients of a forward equalizer;

(b) determining a first tap having the greatest of said respective tap coefficients;

(c) subtracting 1 from the number of stages of said first shift register if the first tap is any one of taps before the center tap;

(d) adding 1 to the number of stages of said first shift register if the first tap is any one of taps after the center tap;

(e) proceeding to step (f) if the first tap is said center tap;

(f) subjecting said first backward equalizer and a second backward equalizer to the control operations of steps (a) through (e); and (g) repeating the control operations of steps (a) through (f).

12. An interference compensator as claimed in claim 5, wherein said plurality of transversal type equalizers comprises a forward equalizer, connected to a first shift register, and a center equalizer, connected to a second shift register; and said plurality of transversal type equalizers does not include a backward equalizer.

* * * * *